(12) United States Patent
Comeau et al.

(10) Patent No.: US 12,546,764 B2
(45) Date of Patent: Feb. 10, 2026

(54) SYSTEM AND METHOD FOR PROVIDING BREATH ALCOHOL INTERLOCK TECHNOLOGY IN ELECTRIC VEHICLES

(71) Applicant: Alcohol Countermeasure Systems (International) Inc., Toronto (CA)

(72) Inventors: Felix J.E. Comeau, Toronto (CA); Chris Tolibas, Toronto (CA)

(73) Assignee: Alcohol Countermeasure Systems (International) Inc., Toronto (CA)

( * ) Notice: Subject to any disclaimer, the term of this patent is extended or adjusted under 35 U.S.C. 154(b) by 0 days.

(21) Appl. No.: 19/051,966

(22) Filed: Feb. 12, 2025

(65) Prior Publication Data
US 2025/0258157 A1 Aug. 14, 2025

Related U.S. Application Data

(60) Provisional application No. 63/552,957, filed on Feb. 13, 2024.

(51) Int. Cl.
*G01N 33/497* (2006.01)

(52) U.S. Cl.
CPC .............. *G01N 33/4972* (2013.01)

(58) Field of Classification Search
CPC ..... B60K 28/063; B60K 28/06; Y10S 436/90; B60W 2540/24; G01N 33/4972
See application file for complete search history.

(56) References Cited

U.S. PATENT DOCUMENTS

| | | | | |
|---|---|---|---|---|
| 4,039,852 A * | 8/1977 | Miyamoto | ............... | A61B 5/18 340/576 |
| 4,093,945 A * | 6/1978 | Collier | ................. | B60K 28/063 340/576 |
| 4,996,161 A * | 2/1991 | Conners | ............. | G01N 33/4972 340/576 |
| 5,426,415 A * | 6/1995 | Prachar | .............. | G01N 33/4972 340/576 |
| 8,201,437 B2 * | 6/2012 | Takata | ............... | G01N 33/4972 73/23.3 |
| 10,040,349 B2 * | 8/2018 | DeVries | .................. | B60R 25/00 |
| 10,877,023 B2 * | 12/2020 | Ruland | .............. | G01N 33/4972 |
| 12,085,546 B2 * | 9/2024 | Smith | ................ | G01N 33/0029 |
| 12,311,759 B1 * | 5/2025 | Simons | ................ | B60K 28/066 |
| 2003/0176803 A1 * | 9/2003 | Gollar | .................... | A61B 5/097 600/532 |
| 2003/0183437 A1 * | 10/2003 | Mendoza | ........... | G01N 33/4972 180/272 |

(Continued)

*Primary Examiner* — Toan C To
(74) *Attorney, Agent, or Firm* — Klarquist Sparkman, LLP

(57) ABSTRACT

The improved breath alcohol ignition interlock is for use with a vehicle having a proximity pilot circuit and is of the type adapted to: receive a signal when a vehicle has been enabled for activation of the drivetrain; upon receipt of that signal, trigger a breath tester to prompt for and receive a breath sample; upon receipt of a breath sample, test for alcohol; and upon a determination that the amount of alcohol in the sample is below the legal limit or other threshold, activate a relay. The improvement comprises: a normally open relay coupled to an ignition active circuit of the vehicle for activation thereby; a normally closed relay coupled to the ignition interlock for activation thereby; and a resistor, coupled to the relays in series, between the proximity pilot circuit and ground.

1 Claim, 7 Drawing Sheets

(56) References Cited

U.S. PATENT DOCUMENTS

2015/0165903 A1* 6/2015 Williams ........... G01N 33/4833
                                                        701/36
2017/0176411 A1* 6/2017 Trainor ................ B60K 28/063

* cited by examiner

SYSTEM AND METHOD FOR PROVIDING BREATH ALCOHOL INTERLOCK TECHNOLOGY IN ELECTRIC VEHICLES

CROSS REFERENCE TO RELATED APPLICATIONS

This application claims priority to U.S. Provisional Application No. 63/552,957, filed Feb. 13, 2024, the entire contents of which are incorporated herein by reference.

FIELD

The invention relates to the field of breath alcohol ignition interlock devices.

BACKGROUND

The installation of breath alcohol testers in internal combustion engine vehicles is well known. Generally, the testers are coupled to a relay that is interposed in the ignition circuit, so that it is impossible to start the vehicle until a breath sample, substantially free of alcohol, has been provided to the device. The installation of breath alcohol testers in electric vehicles is not routine.

SUMMARY

Forming one aspect of the invention is an improved breath alcohol ignition interlock for use with a vehicle having a proximity pilot circuit, the interlock being of the type adapted to:
receive a signal when a vehicle has been enabled for activation of the drivetrain;
upon receipt of that signal, trigger a breath tester to prompt for and receive a breath sample
upon receipt of a breath sample, test for alcohol; and
upon a determination that the amount of alcohol in the sample is below the legal limit or other threshold, activate a relay.

The improvement comprises:
a normally open [N/O] relay coupled to an ignition active circuit of the vehicle for activation thereby;
a normally closed [N/C] relay coupled to the ignition interlock for activation thereby; and
a resistor, coupled to the relays in series, between the proximity pilot circuit and ground.

DESCRIPTION

Figure 1:
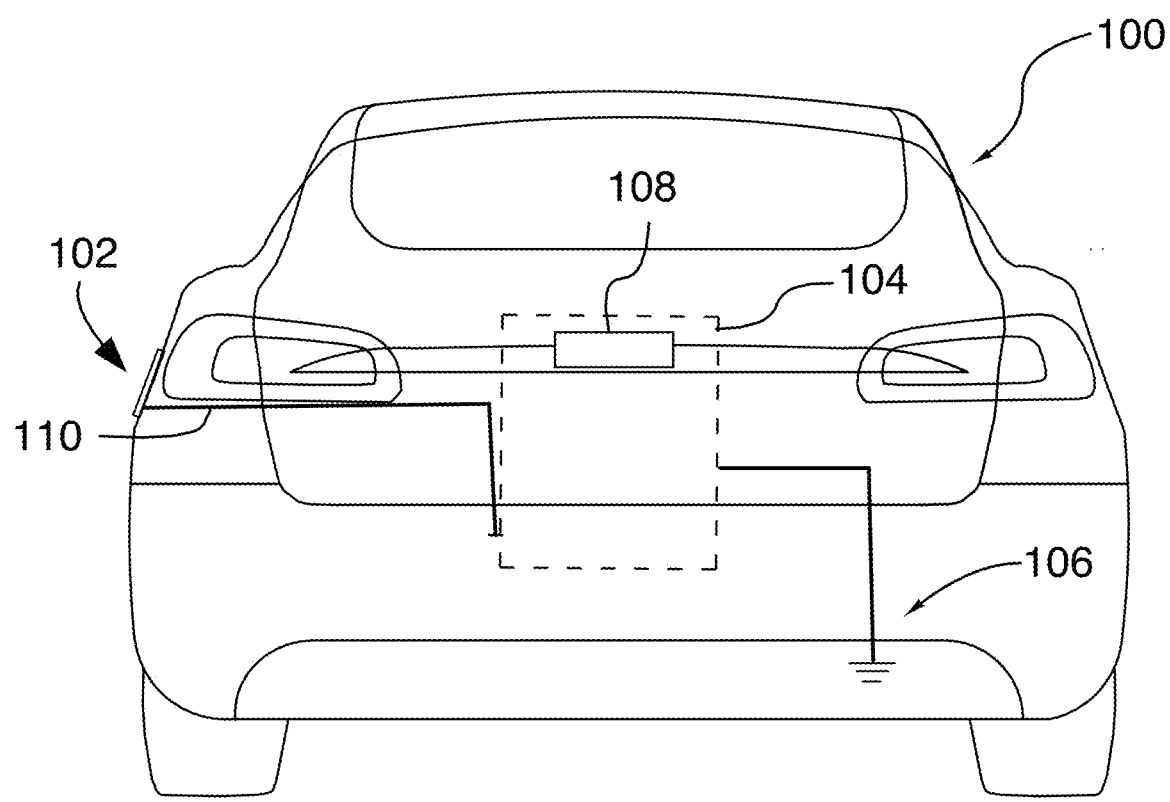
FIG. 1 is a schematic of a prior art vehicle.

The system of the present invention is for use with electric vehicles of the type which include a proximity pilot circuit in the charge port. In this type of vehicle, when a charge cord is coupled to the port, the proximity pilot circuit is connected to ground via a 400 Ohm resistor. The vehicle senses this load and becomes immobile. A schematic of a prior art vehicle is shown in FIG. 1. In the schematic, the vehicle is indicated with reference numeral 100, the charge port with 102, the circuitry of the vehicle with 104 and the ground with 106. The circuit of the vehicle 104 will be understood to include a low voltage ignition active circuit 108, that is, a circuit in the vehicle that has voltage when the vehicle has been put into drive. The proximity pilot wire is indicated as 110.

Figure 2:
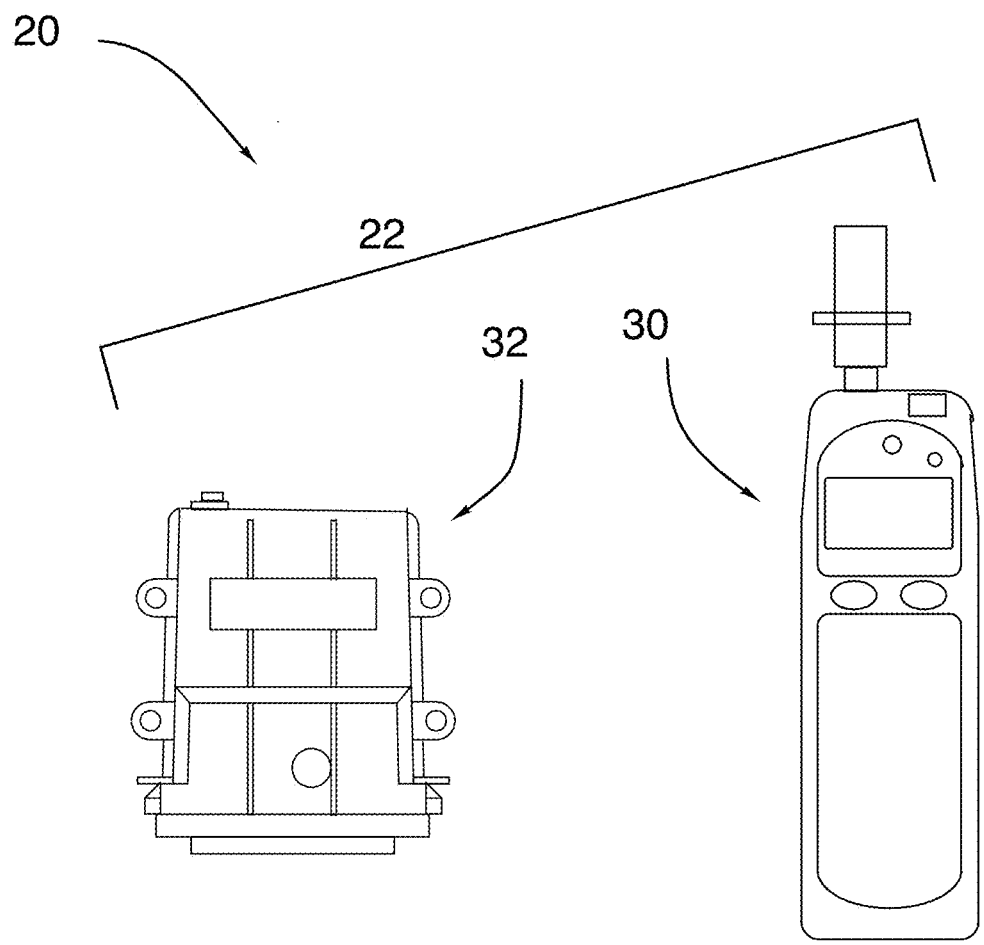
FIG. 2 is an example system according to the present invention.
Figure 2:
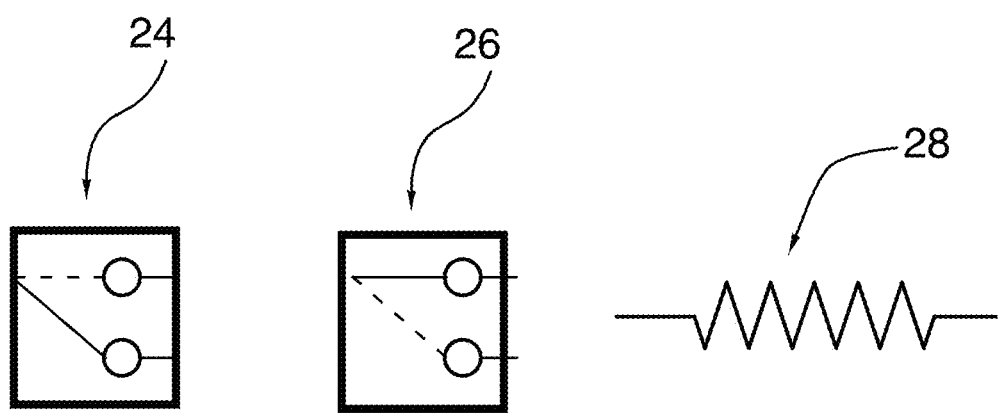

An example system 20 according to the present invention includes an improved breath alcohol interlock device 22, a normally open relay 24, a normally closed relay 26 and a 400 Ohm resistor 28, as shown in FIG. 2. The breath alcohol interlock device 22 will be seen to include a breath tester 30 and a controller 32, and is discussed in more detail below.

To use the system, an initial step is to identify, through trial and error, the low voltage ignition active circuit. This is easily done by a person of ordinary skill in the art. It will be understood that many vehicles will have multiple low voltage active circuits: a single low voltage active circuit is illustrated for clarity, only. This is easily done by a person of ordinary skill in the art.

To use the system:
the improved ignition interlock 22 is coupled to vehicle power through, for example, a circuit made available by the vehicle manufacturer for accessories;
the normally open relay 24, the normally closed relay 26 and the resistor 28 are coupled in series between the ground 106 of the electric vehicle and the proximity pilot wire 110;
the ignition active circuit 108 is coupled to the normally open relay 24 and to the interlock 22; and
the normally closed relay 26 is coupled to the interlock 22

Figure 3:
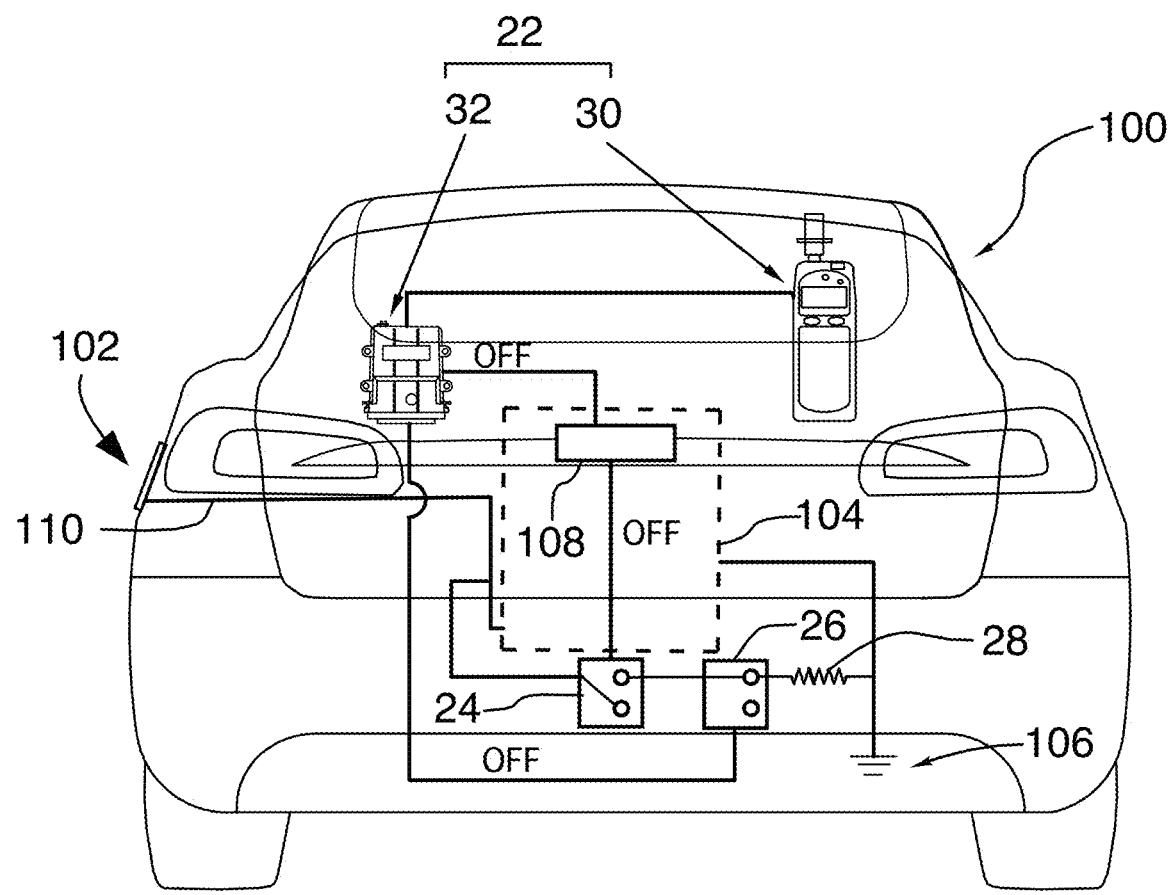
FIG. 3 shows the status of the system after a successful install.

All of the above is shown in FIG. 3 but for the coupling of the interlock to vehicle power, which is routine to a person of ordinary skill. FIG. 3 will be understood to show the status of the system after a successful install, "ignition off", with the connection between the ignition active circuit and the interlock, the connection between the ignition active circuit and the normally open relay and the connection between the normally closed relay and the interlock all being "off", i.e. not energized.

The improved interlock 22 has the functionality of conventional interlocks, i.e. it is adapted to
receive a signal when a vehicle has been turned on [i.e. detects when an ignition key to a vehicle has been turned away from off];
upon receipt of that signal, trigger a breath tester to prompt for and receive a breath sample;
upon receipt of a breath sample, test for alcohol; and
upon a determination that the amount of alcohol in the sample is below the legal limit or other threshold [a good sample], activate a relay.

The improved interlock differs in that: rather than sensing a key turn or its equivalent, its prompt to the breath tester is in response to the ignition active circuit; and rather than triggering an ignition relay to enable operation of a starter upon receipt of a good sample, it causes the normally closed relay to open, and remain open, until such time as the ignition active circuit is deactivated.

The manner in which the system is used and operates will become apparent upon review of FIGS. 4 to 7.

Figure 4:
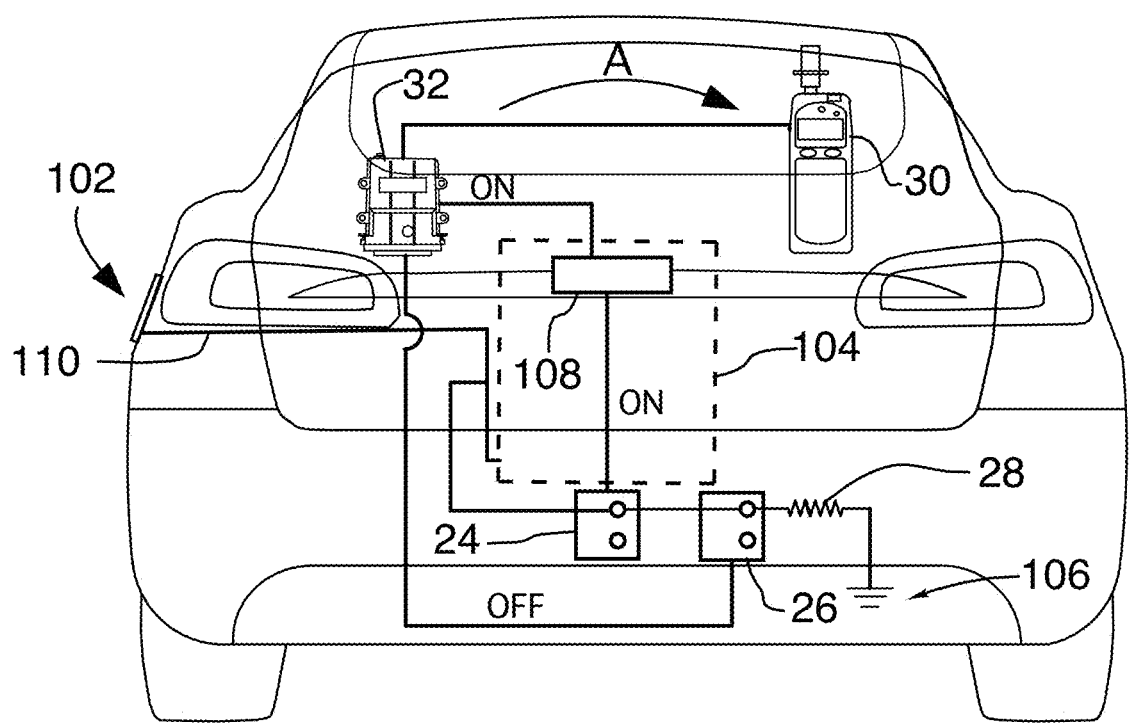
FIG. 4 shows the interlock controller triggering the breath tester to prompt for a breath sample following enablement of the vehicle.

FIG. 4 shows the interlock controller 32 triggering the breath tester 30 to prompt for a breath sample following enablement of the vehicle, i.e. on start up: the prompt being sent to the breath tester is indicated schematically by arrow A. As the vehicle is ignition active mode, the circuits connected to the ignition active circuit 108 are now indicated as "on".

Figure 5:
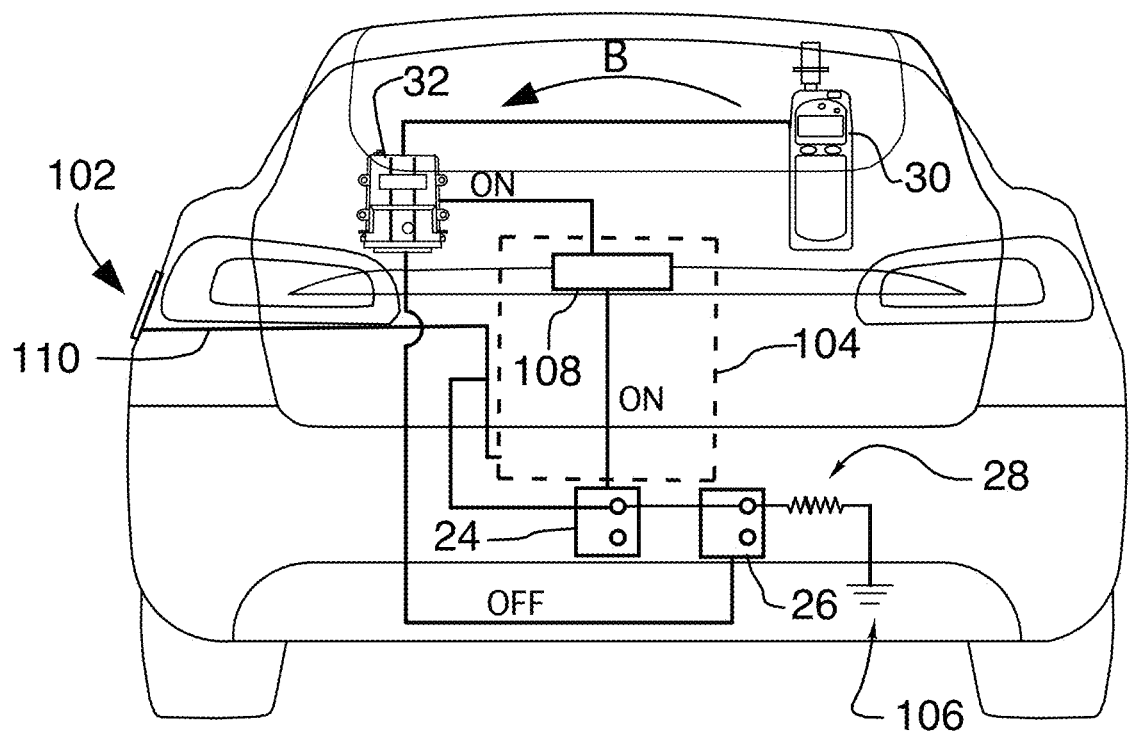
FIG. 5 shows the breath tester advising the controller by arrow B that a good sample has been received.

FIG. 5 shows the breath tester 30 advising the controller 32 by arrow B that a good sample has been received, i.e. a sample that is, inter alia, below the legal limit.

Figure 6:
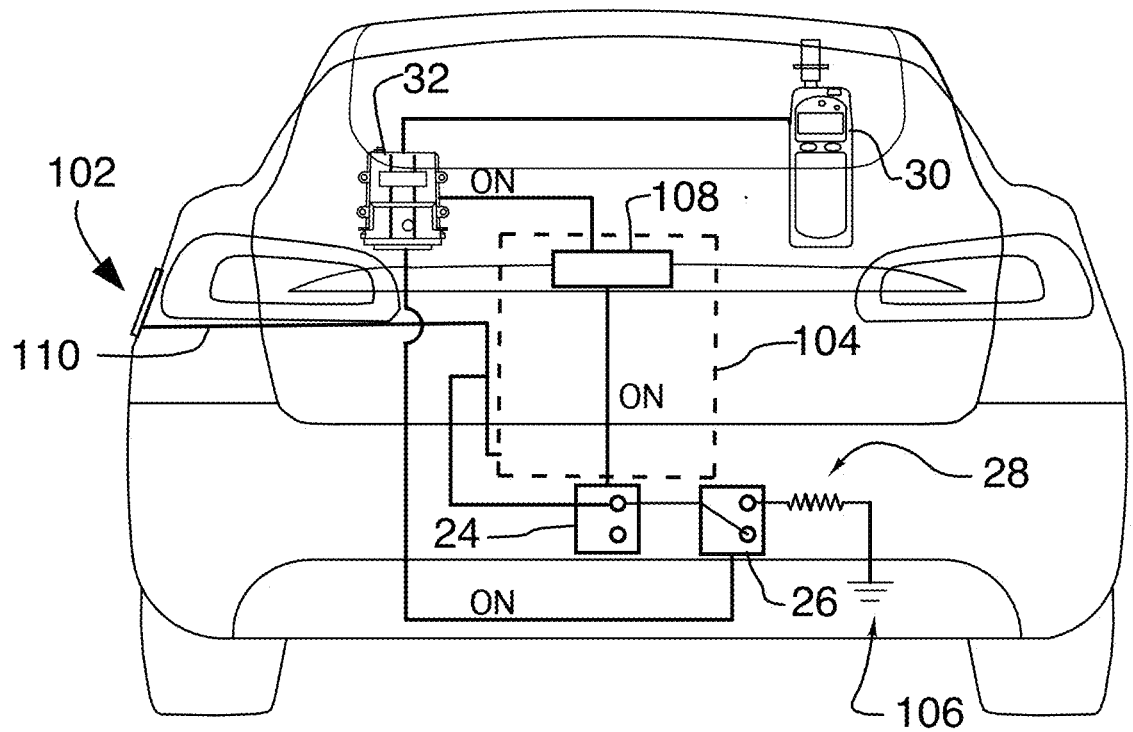
FIG. 6 shows the result of the delivery of the good sample.

FIG. 6 shows the result of the delivery of the good sample. Here, the circuit between the controller 32 and the normally closed relay 26 is "on" such that the normally closed relay is open, thereby disconnecting the proximity pilot circuit 110 from ground 106 and causing the vehicle to disable its immobilizer circuitry and render the vehicle operable for movement.

Figure 7:
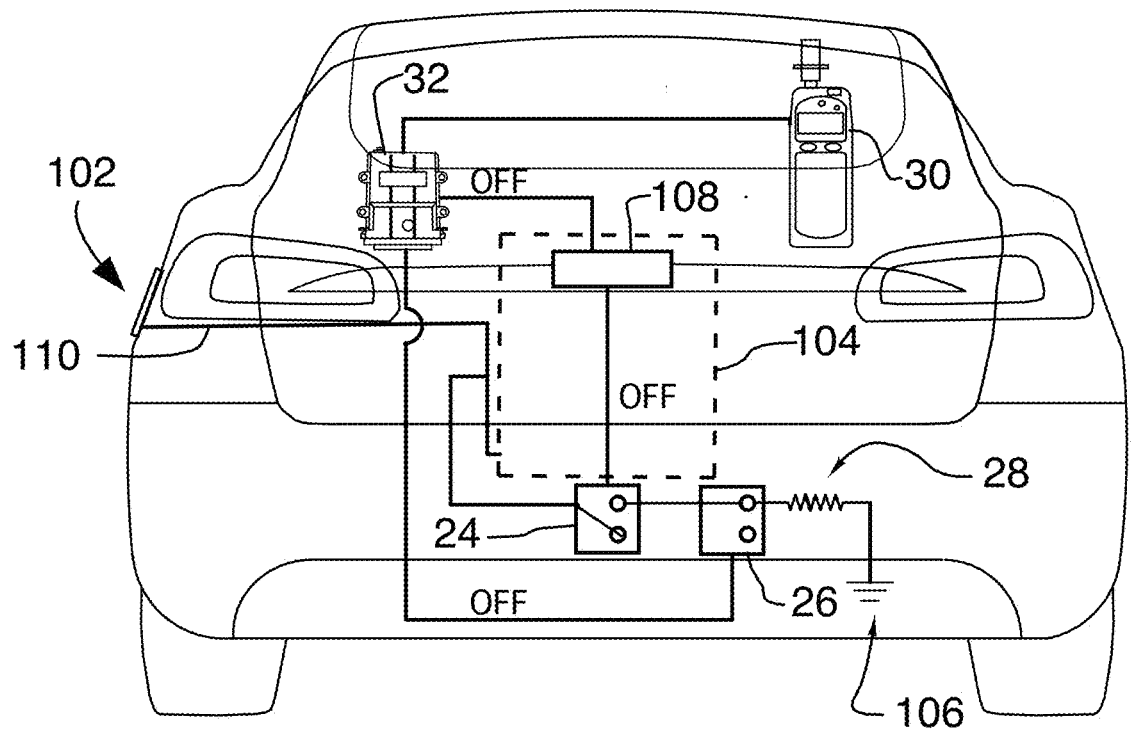
FIG. 7 shows that normally open and normally closed relays return to the rest states upon deactivation of the vehicle.

FIG. 7 shows that normally open 24 and normally closed 26 relays return to the rest states upon deactivation of the vehicle.

Whereas a specific embodiment is herein shown and described, modifications are possible. Without limitation in this regard, it is specifically contemplated that the connection between the ignition active circuit and the normally open relay could be, instead of a wire running directly therebetween as shown, a wire that runs from the ignition active circuit to the interlock controller and then to the normally open relay.

Further, the normally open relay, the normally closed relay and the resistor could be packaged in a single module, or incorporated into the interlock controller itself.

Of course, in modern vehicles, there is often no need for a key to be turned.

Accordingly, the invention should be understood to be limited only by the accompanying claims, purposively construed.

The invention claimed is:

1. A breath alcohol ignition interlock for use with an electric vehicle having a proximity pilot circuit in a charge port of the electric vehicle, an ignition active circuit, and a drivetrain, the interlock being adapted to:
   receive a signal from the vehicle when the vehicle has been enabled for activation of the drivetrain;
   upon receipt of the signal, trigger a breath tester to prompt for and receive a breath sample;
   upon receipt of the breath sample, test for an amount of alcohol in the breath sample; and
   upon a determination that the amount of alcohol in the breath sample is below a threshold, activate a relay,
the improvement comprising:
   a normally open relay coupled to the ignition active circuit of the vehicle for activation thereby;
   a normally closed relay coupled to the interlock for activation thereby; and
   a resistor, coupled to the relays in series, between the proximity pilot circuit and ground.

* * * * *